United States Patent [19]

Delhaye et al.

[11] Patent Number: 4,523,799
[45] Date of Patent: Jun. 18, 1985

[54] DEVICE OPTIMIZING THE COUPLING OF TWO OPTICAL SYSTEMS FOR THE OBSERVATION AND ANALYSIS OF OBJECTS

[75] Inventors: Michel M. Delhaye, Villeneuve d'Ascq; Paul A. Dhamelincourt, Anvoeullin; Edouard F. da Silva, Auneuil; Jacques H. Barbillat, Villeneuve d'Ascq, all of France

[73] Assignee: Agence Nationale de Volorisation de la Recherche (ANVAR), Paris, France

[21] Appl. No.: 446,975

[22] Filed: Dec. 6, 1982

[30] Foreign Application Priority Data

Dec. 4, 1981 [FR] France ............... 81 23322

[51] Int. Cl.³ .................. G02B 27/17; G02B 21/00
[52] U.S. Cl. ........................ 350/6.3; 350/527
[58] Field of Search .................. 350/6.1–6.5, 350/527, 507, 501; 250/234, 235, 236

[56]  References Cited

U.S. PATENT DOCUMENTS

| 3,005,916 | 10/1961 | Lentze | 350/6.3 |
| 3,062,965 | 11/1962 | Sick | 250/236 |
| 3,360,659 | 12/1967 | Young | 250/236 |
| 3,460,880 | 8/1969 | Henderson | 350/527 |
| 3,517,980 | 6/1970 | Petrah et al. | 350/527 |
| 3,700,911 | 10/1972 | Wildhaber | 350/6.3 |
| 3,705,755 | 12/1972 | Baer | 250/236 |
| 3,926,500 | 12/1975 | Frosch et al. | 350/527 |
| 4,109,999 | 8/1978 | Kiyono et al. | 350/527 |
| 4,218,112 | 8/1980 | Ruker | 250/234 |
| 4,241,257 | 12/1980 | Koester | 250/235 |
| 4,251,129 | 2/1981 | Suzki et al. | 350/527 |
| 4,301,374 | 11/1981 | Hashive | 250/236 |
| 4,311,384 | 1/1982 | Keene | 350/6.4 |

Primary Examiner—Jon W. Henry
Attorney, Agent, or Firm—Harding, Earley, Follmer & Frailey

[57]  ABSTRACT

The present invention concerns a device optimizing the coupling of two optical systems for the observation and analysis of objects, one of the systems producing the illumination of a point on the object being studied while the other produces the image of that point in an analyzer.

The device is characterized by the fact that it contains a coupling optic 10 redirecting on the principal optical axis of the second system 12 a beam transmitted by the first system 11 even when the beam is located outside of the principal axis of that first system.

Applicaiton is to spectral analysis, especially by microscope or telescope.

12 Claims, 8 Drawing Figures

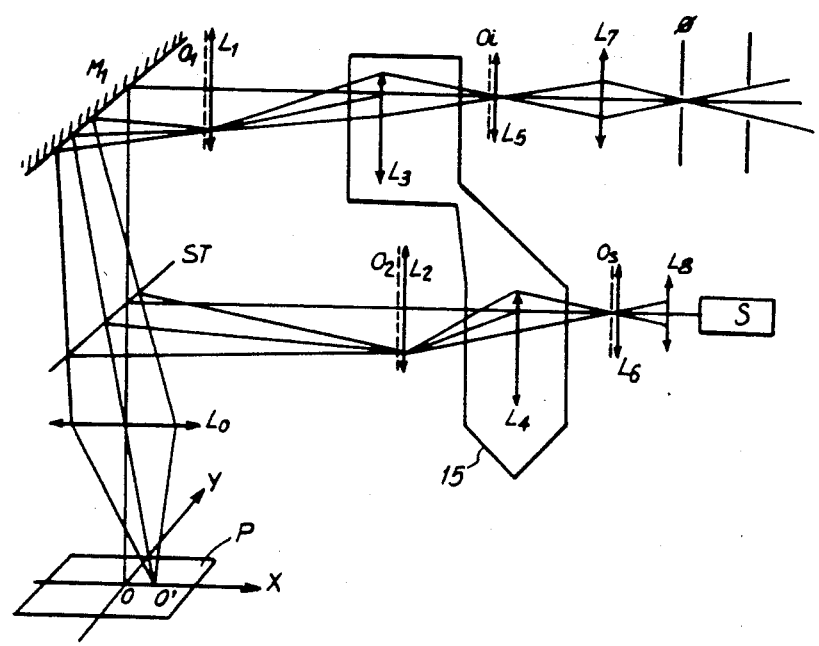

DEVICE OPTIMIZING THE COUPLING OF TWO OPTICAL SYSTEMS FOR THE OBSERVATION AND ANALYSIS OF OBJECTS

TECHNICAL AREA

The present invention concerns a device optimizing a coupling of two optical systems for the observation and analysis of objects, one system producing the illumination of a given point of the object, while the other produces the image of said point in the analyzer.

THE PROBLEM

It concerns, in particular, in spectral analysis by monochromator, spectrograph or interferometer, examining the different parts of an object by a scanning process while maintaining maximum precision, clarity and resolution.

STATE OF THE PREVIOUS TECHNOLOGY AND DISADVANTAGES

Optical devices already exist, notably in the areas of microscopy and teledetection, which enable:
pin-point illumination of the object (through the viewing objective lens or by a separate system),
observation of different areas of the viewing field by adjustment of either
the object,
or the objective lens
or flat or spherical mirrors which deflect the light beams.

These devices have numerous disadvantages, among which are:
the adjustment of the entrance pupil in relation to the object, or the adjustment of the object (that is the object holder) in relation to the pupil, must be performed very precisely when it is done on objects examined under the microscope. In fact, scanning along lines separated by one tenth or less of a micron cannot be done with reasonable accuracy.

in cases where they are coupled with a radiance detector of a spectral analyzer, the adjustment of the pupil is manifested by poor coverage of the range of the beam accepted by the detector or analyzer which results in a loss of resolution and/or an energy loss. But selecting an analyzer with a much greater beam range than that of the objective lens, results in a high parasitic energy level unfavorable to the precision of the measurements.

It must also be pointed out that, when the object examined is congested, heavy or inaccessible, it cannot be moved.

Also, spectral analysis of an immobile object in which the surface is examined by optical means is known. That is done in two ways:

The first way consists of transmitting the beam which illuminates the area observed through the objective used for receiving the analysis light. This is achieved by means of small mirrors or prisms placed in the path of the observation beam.

A second method consists of using two separate optics for the illumination and analysis beams.

In these two cases, the illumination of a small surface of the object (illumination improperly called "pin-point") is produced, and the image of the small surface, recaptured by an objective, is projected on the entrance orifice of a radiance detector or a spectrum analyzer (monochromator, spectrograph or interferometer).

The present invention is based on these existing devices and partly on the concept that different parts of the object can be examined by a scanning process connecting the adjustment of the illumination beam with the adjustment of optical elements such that the synchronization of the illuminated area with a detector or analyzer is assured for every area of the field observed.

It is necessary, therefore, to provide a first optical system for illumination and a second optical system for examination or detection. However, these two systems can have parts in common.

SUMMARY OF THE INVENTION

In a general way the invention is characterized principally by the fact that the device consists of a coupling optic for redirecting along the principal optic axis of a second optical system (examination or detection system) a beam transmitted by a first optical system (observation and illumination system) even when the beam is located outside of the principal axis of this first system.

More specifically, the device is characterized by the fact that it includes an optical transmitter system starting with a light source and an optical receiving system which terminates in an analyzer, these optical systems including fixed optical converging elements at the entrance and exit of a coupling optic or device and movable optical deflecting elements placed between the fixed elements at a part of the beam where the images of the points of the object being examined are formed, the said optical deflecting elements being subjected to precisely synchronized movements and having like optical characteristics.

In fact, the object is seen through a fixed objective lens and the beam, behind the objective, divides into a beam of illumination originating from a fixed source and a beam of examination terminating at a fixed pupil. Each of the two separated beams passes through optical deflecting elements which are actuated through a scanning movement to deflect the beams to produce an analogous scanning on the object. Fixed standard field lenses are provided at the locations where the images of the points on the surface of the object are formed.

In a first embodiment, the optical deflecting elements are convex lenses. In another embodiment, they consist of a system of mirrors. In a third embodiment, they can be comprised of a combination of lenses and mirrors.

To facilitate the arrangement of the apparatus, the beam is divided in two behind the objective by a beam splitter.

In a first case, the beam splitter is placed between an optical deflecting element and the optical receiving system in such a way that there is need for only one optical deflecting element actuated in a scanning motion which acts on the transmitted beam in one direction, and on the received beam in the opposite direction.

When conditions require it, a mirror is placed behind the objective which enables a more convenient examination, for example, in the case of a microscope. However, in order to examine an object at a distance, such a mirror can very well be eliminated in order to be able to examine the said object directly.

In a second case, the beam splitter is placed behind the objective and each of the two beams traverses an optical deflecting element, the movement of these two deflecting elements being in precise synchronization. For structural reasons, it is preferred that a mirror be placed parallel to the beam splitter and behind it in order that the two beams have their principal axes parallel to each other, especially at the level of the optical deflecting elements, so that they may be affixed to a single mounting which is activatable for the scanning movement.

The device of the invention uses filtered incoherent or coherent (LASER beam) monochromatic, polychromatic light in the visible range, ultra-violet or infra-red.

PROBLEM SOLUTION, ADVANTAGES AND INDUSTRIAL RESULT

The device of the invention has applications in the field of infra-red imagery, thermography as well as in colorimetric or spectral analysis of objects, extending even to the ultra-violet, the visible spectrum and the infra-red spectrum.

It can also serve in the analysis of the distribution of the phenomena of reflection, transmission, diffusion of light and fluorescence or phosphorescence on or in the samples.

It can also be used in teledection, for example, by satellite.

It also has applications in macroscopy and microscopy.

The advantages are numerous.

The only mechanical adjustments are those of the optical deflecting elements. In the case of the microscope, these adjustments are performed in an area of the instrument where the images are greatly enlarged. The mechanical control of this adjustment is therefore considerably simplified and the precision is improved.

There no longer is an adjustment of the pupil. Consequently, good coverage can be obtained of the entire range of the beam admitted by the detector or the analyzer. Thus, a good resolution is obtained and maximum energy can be recovered. The analyzer will be able to receive through an entrance pupil of small dimension a beam corresponding to that of the objective and thus will lower the level of parasitic energy, resulting in an improvement in the accuracy of the measurements.

It is important to point out that when an object is congested or inaccessible, its adjustment is difficult or impossible. Yet, the device of the invention enables its analysis by means of scanning.

The invention will be better understood with the aid of the following description which gives some non-limiting examples of its practical embodiments, the latter being illustrated by the attached drawings.

BRIEF DESCRIPTION OF THE FIGURES OF THE DRAWINGS

FIGS. 2a and 2b represent a first version of the device of the invention with optical deflecting elements located first for maintaining the beams in the principal optical axes and then in an altered position in reference to them.

DESCRIPTION OF THE PREFERRED EMBODIMENTS

Figure 1:
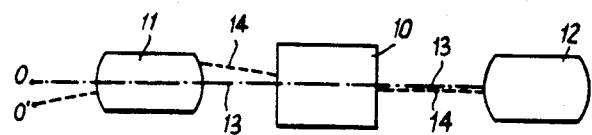
FIG. 1 is a block diagram representing in a very general way the device of the invention.

Referring to FIG. 1, a schematic representation 10 of the coupling device of the invention is located between two optical systems 11 and 12, the ensemble being provided for observing any point O or O' of an object. In the present case and in the remainder of the description, it will be understood that point O, O' is not meant to indicate the strict geometric meaning of the word "point", but the physical sense of a pin-point area which can be subjected to an optical enlargement in a microscope or telescope. The second optical system 12 emits an illumination ray represented by the dash-dot line 13 which coincides with the principal optical axis of the ensemble. The system 12 also includes an analyzer which receives the analysis or examination ray 14 shown as a dotted line and which comes from a point O or O' of the object illuminated by the ray 13.

The first optical system 11 is a standard optic which includes, for example, an objective lens, mirrors, various other lenses, etc. . . It is fixed, as is system 12. In principle, the object examined, represented by the two points O and O', is also fixed.

The coupling device 10, which is the essential part of the invention, in an optical system composed of elements described in more detail later, capable of redirecting the rays 13 and 14 along the principal optical axis of the system 12 even if those rays 13 and 14 are outside of the axis of the system 11 when coming from any one point O, O' or other of the object observed.

In fact, the coupling device 10 produces a deflection of rays transmitted by the system 12 in such a way as to systematically scan the object observed. The object transmits a ray back over the same path in reverse and the coupling device 10 redirects the retransmitted ray along the optical axis between the device 10 and the optical system 12 so that it impacts on the analyzer included there. Thus, this analyzer, which is immobile, receives systematically information from the whole surface of the scanned object due to the coupling device 10 of the invention, which is now going to be described in more detailed fashion in two different versions.

Figure 2A:
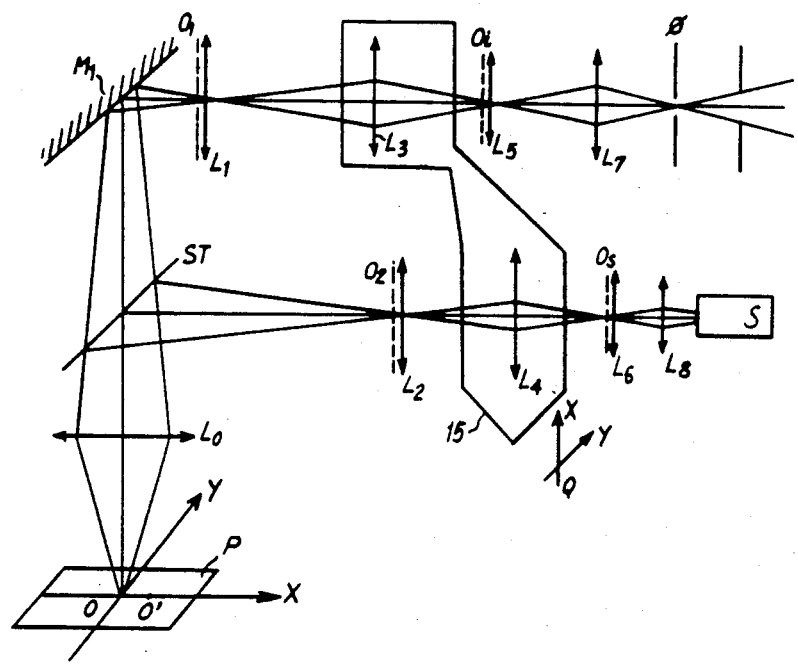

In the first version, represented in FIGS. 2a and 2b which illustrate principally a microscope, but which can be applicable to a telescope, the object is shown in the form of a plane P on which are traced two axes, X and Y, intersecting at point O. Point O' is also shown on the X axis, but the same explanation applies for any other point located at any position on the plane P. An objective lens Lo is set at the same time:
- to focus on the plane P the light in plane 02 coming from a source S,
- to receive the analysis light in order to form the image of the object P in the plane 01.

Depending on the requirements of the analysis, the source S emits a coherent or incoherent, monochromatic or polychromatic, light.

A beam splitter ST is provided which permits use of the same objective Lo for fulfilling the two functions of focusing the light on the object, and recovering the light for analysis and forming the image on plane 01.

In order to facilitate the work of the instrument, the beam of observation is reflected by the mirror M1 in a direction parallel to the illumination beam coming from source S. In other words, the beam splitter ST and the mirror M1 are parallel.

Optical system 11 includes objective lens Lo, beam splitter ST and mirror M1. Optical system 12 includes a source of light S and a radiance detector or analyzer ∅. The device illustrated in FIGS. 2a and 2b also may include image planes 01, 02, 0i and 0s.

The planes 01 and 02 are, respectively, through synchronized planes 0i and 0s
with the entrance of the detector or radiance analyzer ∅,
with the light source S,
by the intermediary optical system or "coupling optic" 10.

This coupling optic or device 10 consists of fixed elements and movable elements. The fixed elements are
the field lenses L1, L2, L5 and L6, which have the role of retaining the maximum of the ray in the interior of the beam, and
optionally, the intermediary objectives or objective lenses L7 and L8.

The movable elements of coupling optic 10 are reciprocable convex lenses L3 and L4 rigidly connected to each other, whereby their translational movement is precisely synchronized in planes perpendicular to the principal optical axes in such a way as to form, respectively, the image of plane 01 on analyzer ∅ and the image of source S on plane 02.

In order to assure the simultaneous scanning of the object by the two beams of illumination and analysis, the ensemble of the movable elements L3 and L4 is shifted perpendicularly to the optical axes without modification of the optical path.

However, the path could be modified or the objective Lo regulated as a function of the unevenness of the object examined. It would be a matter of adjusting the focusing. This translation movement can be achieved in two directions, X and Y, with excellent precision and in a reproducible manner, for example, in a manner utilizing a systematic scanning.

The adjustment of the movable elements L3 and L4 is achieved in such a way as to maintain the surface P of the object illuminated by the source while that same surface is observed by the detector or analyzer ∅.

The synchronization of the rectilinear movement of the elements L3 and L4 is accomplished by well known means (not shown), which could be mechanical (lever, rack, gear), electro-mechanical (Selsyn or the like), or any other known connection fulfilling such an auxiliary service.

The means which has been shown schematically in FIGS. 2a and 2b is a mounting or box 15 which is adjustable by guides in the directions QX and QY corresponding to the directions OX and OY of the plane P.

However, it must be noted that the movable elements L3 and L4 are placed in the optical system, between the fixed lenses L1 and L5 on the one part and the fixed lenses L2 and L6 on the other part, in sections of the beam where the images of the points O and O' of the object P are greatly enlarged such that the adjustments along QX and QY axes are much more significant than the adjustments along the OX and OY axes; the relation between these adjustments being proportional to the magnification of the microscope.

The detector ∅ is precisely synchronized with the illuminated area O' of the object P throughout the field, which is limited only by the dimensions of the optical elements.

The range of the beams is not modified by the translational movements of the elements L3 and L4, and the entrance and exit pupils of the instrument remain fixed.

Figure 3A:
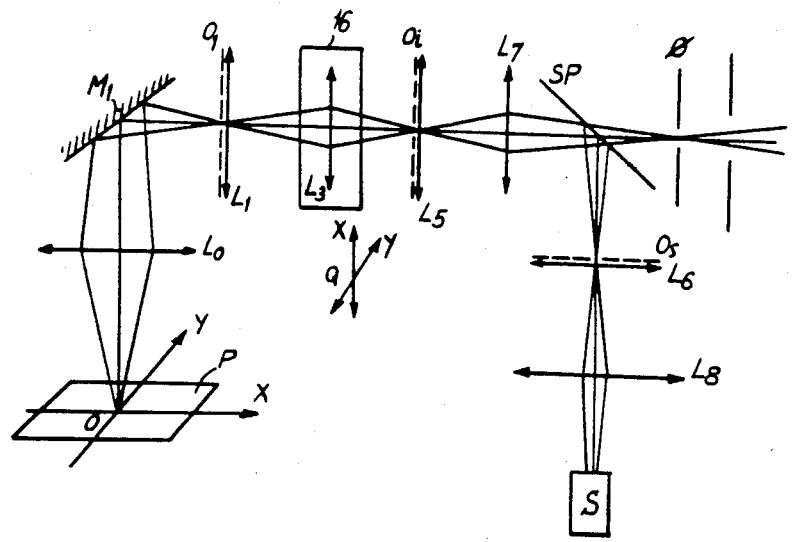
FIGS. 3a and 3b represent a second version of the device of the invention with only one optical deflecting element, first for maintaining the beam in the principal optical axis and then shifting the beam with reference to that axis.
Figure 3B:
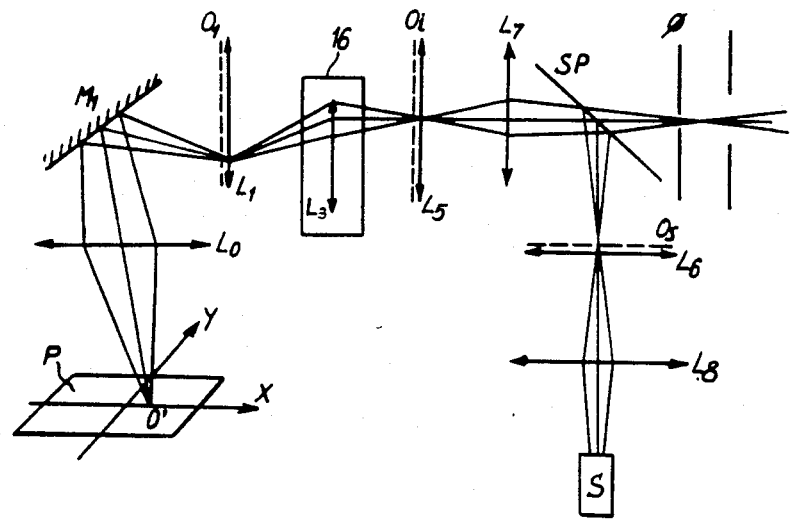

In the second version of the device of the invention (still applicable as well to the microscope as to the telescope), which is represented in FIGS. 3a and 3b where the same elements have been indicated by the same reference marks, the beam splitter ST of FIGS. 2a and 2b is eliminated and a beam splitter SP is placed between the objective L7 and the entrance of the detector or analyzer ∅, in order to reflect perpendicularly the beam coming from the source S through the objective L8 and the field lens L6. This arrangement results in a simplification by virtue of the elimination of the field lens L2 and the movable element L4 shown in FIGS. 2a and 2b. There is, in addition, only a single movable box 16 which contains the movable element L3, which is activated with a scanning motion along the QX and QY axes. The mechanical simplification is very great since a synchronization device no longer is provided.

Figure 4:
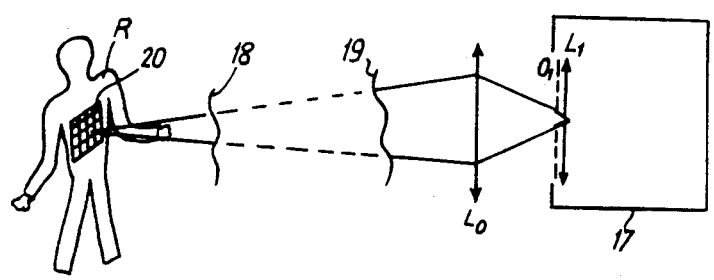
FIG. 4 represents another version of the device of the invention permitting the analysis of a distant body by telescope.

An even greater simplification is represented in FIG. 4 where the mirror M1 has been eliminated. The instrument of the invention is schematically represented at 17 with its objective lens Lo enabling the observation of an object R at a given distance (represented by the two lines 18 and 19) and, in particular, enabling the analysis of a sector 20 of the object R, the sector 20 being illustrated by a grid representing the scanning.

It should be observed that the device of the invention can easily be adapted to any existing microscope or telescope with very little modification.

It should also be observed that the scanning is executed without influencing the beam passing through the opening of the deflector or analyzer ∅. Therefore, by reducing the working section, parasitic light is eliminated, maximum illumination is obtained and resolution is increased. In other words, a better S/N (signal/noise) relation is obtained.

Referring back to FIGS. 2a and 2b, it is necessary also to stress the fact that in the case of a small object, the adjustments performed in the image plane, where the movable elements L3 and L4 are adjusted, are a magnification of the primary optical system 11 which includes the objective Lo. For example, scanning of 100 microns × 100 microns in the object plane of a microscope with an enlargement of 50 corresponds to an adjustment of 5 × 5 mm of the elements L3, L4.

It goes without saying that detailed modifications coming within the framework of technical equivalents do not depart from the invention. In particular, separate objectives could be used for the illumination and the analysis beams even though that would complicate the result. It would suffice to retain the mirror M1, but provide another mirror in place of the beam splitter ST at a location away from the beam coming from mirror M1, which would reflect an illumination beam onto the plane P at a point that would reemit a collected beam toward the analyzer ∅. Oscillation of the two lighting and emitting beams would be obtained in the same manner by the movable elements L2 and L4.

As in existing microscopes and as it is well known in optics, another variation would consist of utilizing two different areas of the same objective Lo, one area for transmitting the illumination beam and the other area for receiving the reemitted beam.

In general, the movable elements L3 and L4 are convex lenses. However, these lenses could be replaced by a system of mirrors or, also, by a system combining lenses and mirrors, in the single box 16.

Figure 5:
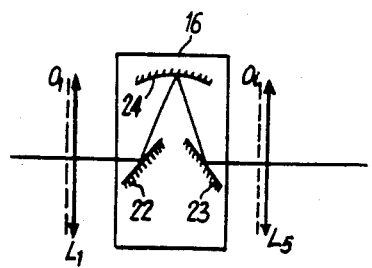
FIG. 5 is a diagram of a second version of an optical deflecting element composed solely of mirrors.

In the example represented in FIG. 5, the box 16, situated between the two field lenses L1 and L5, contains an optical deflecting element composed of two flat mirrors 22, 23 and a concave mirror 24 which perform the same role as the convex lens L3.

Figure 6:
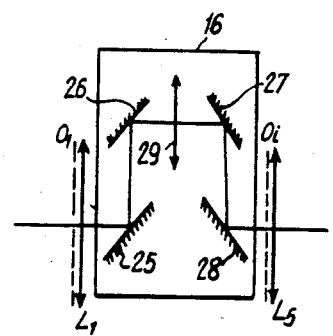
FIG. 6 is a diagram of a third version of an optical deflecting element composed by a combination of lenses and mirrors.

In the example represented in FIG. 6, the same box 16 contains an ensemble of four flat mirrors 25, 26, 27, 28 and a biconvex lens 29 which also perform the same role as the convex lens L3.

Other systems of concave lenses and mirrors can be envisioned. In this last case, a scanning can be envisioned obtained by oscillation of the mirror about two appropriately oriented perpendicular axes.

We claim:

1. An optical coupling device for coupling two optical systems for the observation and examination of objects, one said system being an examination system and including a source of light and a radiance analyzer and the other said system being an observation system and including an objective lens, said coupling device being operative to redirect an examination beam transmitted by the observation system along the principal optical axis of the examination system, characterized by
   (a) a plurality of fixed lenses disposed at locations in said beam where images of points of an object are formed and
   (b) at least one optical deflecting element disposed between the fixed lenses at a location in said beam where said images are enlarged,
   (c) said optical deflecting element being movable rectilinearly to deflect the beam to carry out an analogous scanning of the object.

2. Coupling device such as defined in claim 1, characterized by two optical deflecting elements, said elements having similar optical characteristics and being connected for precisely synchronized reciprocal movement.

3. Coupling device such as defined in claim 2, characterized by the fact that the light source emits coherent light.

4. Coupling device such as defined in claim 2, characterized by the fact that each of the optical deflecting elements comprise one or more lenses.

5. Coupling device such as defined in claim 2, characterized by the fact that the optical deflecting elements are mirror systems.

6. Coupling device such as defined in claim 2, characterized by the fact that the optical deflecting elements are combined mirror and lens systems.

7. Coupling device such as defined in any one of the claims 2, 4, 5 or 6, characterized by the fact that the beam is separated into two beams by a beam splitter.

8. Coupling device such as defined in claim 7, characterized by the fact that the beam splitter is disposed behind the objective and that each of the two separated beams traverses an optical deflecting element, the movement of these two deflecting elements being precisely synchronized.

9. Coupling device such as defined in claim 8, characterized by
   (a) a mirror disposed parallel to and behind the beam splitter, whereby the two separated beams have their principal axes parallel to each other and substantially at the level of the optical deflecting elements, and
   (b) a common mounting for supporting the optical deflecting elements, said mounting beam movable rectilinearly to impart to the optical deflecting elements a scanning movement of relatively large amplititude.

10. Coupling device such as defined in claim 1, characterized by the fact that a mirror is disposed behind the objective.

11. Coupling device such as defined in claim 1, wherein a beam splitter separates a beam into an illumination beam coming from the light source and said examination beam, characterized by an optical deflecting element disposed in the coupling device at a location traversed by the two separated beams.

12. Coupling device such as defined in claim 11, characterized by
   (a) a single optical deflecting element and
   (b) the beam splitter being disposed between the optical deflecting element and the radiance analyzer,
   (c) said optical deflecting element being movable back and forth in a scanning motion to act on the illumination beam when said element is moved in one direction and to act on the examination beam when said element is moved in the other direction.

* * * * *

UNITED STATES PATENT OFFICE
CERTIFICATE OF CORRECTION

PATENT NO. : 4,523,799
DATED : June 18, 1985
INVENTOR(S) : Michel M. Delhaye et al.

It is certified that error appears in the above-identified patent and that said Letters Patent are hereby corrected as shown below:

Abstract

Line 12, change "Applicaiton" to --Application--

Column 4

Line 29, change "in" to --is--

Column 5

Line 8, delete ", respectively, through syn-" and substitute --synchronized, respectively, through--

Line 9, delete "chronized"

Signed and Sealed this

Twenty-fourth Day of September 1985

[SEAL]

Attest:

Attesting Officer

DONALD J. QUIGG

Commissioner of Patents and Trademarks—Designate